(No Model.)
L. W. FRENCH.
ANIMAL POKE.
No. 604,744.　　　　　　　　　Patented May 31, 1898.
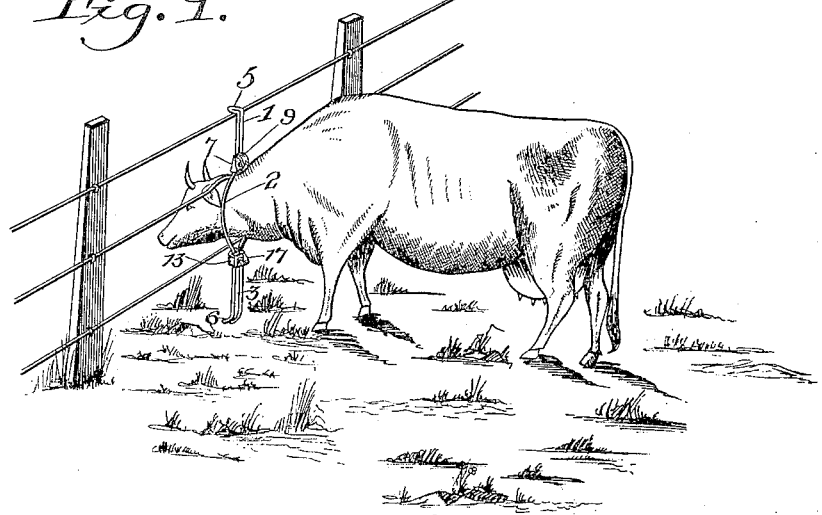
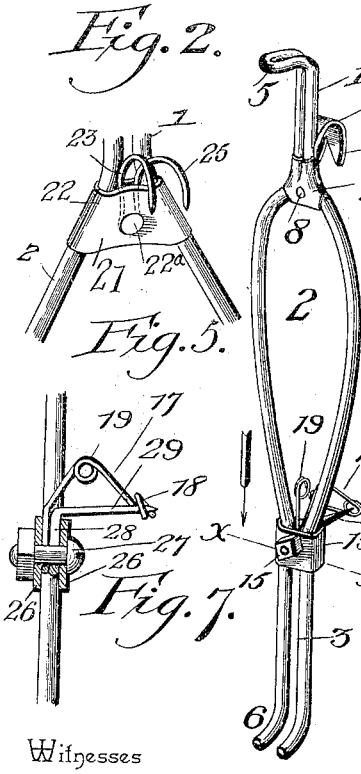
Witnesses
A. R. Appleman
Edwin Cruse
By his Attorneys,
C. A. Snow & Co.
Inventor
Leroy W. French.

UNITED STATES PATENT OFFICE.

LEROY W. FRENCH, OF PHILLIPSBURG, KANSAS.

ANIMAL-POKE.

SPECIFICATION forming part of Letters Patent No. 604,744, dated May 31, 1898.

Application filed September 29, 1897. Serial No. 653,486. (No model.)

*To all whom it may concern:*

Be it known that I, LEROY W. FRENCH, a citizen of the United States, residing at Phillipsburg, in the county of Phillips and State of Kansas, have invented a new and useful Animal-Poke, of which the following is a specification.

This invention relates to animal-pokes, especially that class which are provided with spurs or prods which will prick or prod the animal when it attempts to pass a fence or other barrier; and the object of the invention is to produce a simple and efficient appliance of this class which can be worn by the animal without liability of injuring it unless it attempts to pass through a fence.

The invention consists of the several details of construction and combination of parts, as will be hereinafter fully described, and particularly pointed out in the claims.

In the drawings, Figure 1 is a perspective view showing my improved poke applied to a cow. Fig. 2 is a perspective view of the poke detached. Fig. 3 is a rear elevation of the same. Fig. 4 is a horizontal section on the line X X of Fig. 2, on an enlarged scale. Fig. 5 is a detail view in perspective of a modified form of the upper spur attachment for the poke. Fig. 6 is a similar view of a modified form of the lower spur attachment. Fig. 7 is a detail central vertical sectional view of the construction shown in Fig. 6.

Like numerals of reference designate corresponding parts throughout the several figures of the drawings.

The collar and arms of my improved poke are formed of a single piece of wire bent upon itself midway of its length, and the two sections of the wire are continued close together for a suitable distance to form the upper arm 1, and they are then spread apart to form the collar or yoke 2, which is substantially ovoid in form, and the wires extend from the lower end of the collar substantially parallel to each other, but spaced apart to form the lower arm 3. Each of the arms 1 and 3 is bent at substantially a right angle at its outer end to form the hooks 5 and 6, respectively. The two sections of the wire are secured together at the junction of the collar and the upper arm by means of a strip of sheet metal 7, which is folded to embrace the wire and secured in place by means of a rivet 8 or similar device. One of the end portions of the strip of metal is curved outwardly and downwardly to form a hook 9, which is provided with spaced teeth or prods 10 at its outer end. The points of the teeth are above the top of the collar, so that they will not in any manner interfere with the animal unless the upper portion of the collar is forced rearwardly, as would be the case should the upper arm come in contact with a fence-wire when the animal was trying to force its way through the fence. When the upper arm is forced backwardly, the teeth 10 will be forced into the animal's neck and cause it sufficient pain to make it desist from its efforts to pass through the fence.

11 indicates a block which is provided with spaced grooves 12 on one face to receive the spaced wires which form the lower arm, and 13 indicates a clip formed of a strip of sheet metal bent to U form and fitted over the wires and the sides of the block 12.

14 indicates a pin which is provided with a flange 14ª intermediate its ends, and one portion of the pin is adapted to pass through the clip and the block, so that the flange will bear against the face of the block, and the end of this portion is threaded to receive a nut 15, which will engage the clip and when it is tightened up on the threaded end of the pin will effectually clamp the block and the clip on the wires and to each other. It is obvious that by loosening the nut the clip and block can be adjusted vertically on the wires and thereby increase or decrease the length of the collar, as may be necessary. The other portion of the pin 14 is bifurcated and extends forwardly in front of the block, and the arms 16 thus formed are pointed and constitute prods adapted to be forced into the breast of the animal when the lower arm is engaged with a fence-wire in the effort of the animal to pass through the fence.

17 indicates guard-springs which are formed of wire and provided with looped portions 18, which project in front of the pointed ends of the prods 16 and serve to prevent the prods from entering the animal under normal conditions. Coils 19 are formed in the wire intermediate the loops and the ends 20, and these ends are firmly clamped between the clip 13 and block 14. The coils are so disposed that the looped ends of the springs will normally project forwardly; but in the event of the animal making an effort to pass through a fence the lower arm will be caught by one of the fence-wires and forced inwardly toward the animal and the coils will yield sufficiently to permit the prods 16 to enter the animal and cause it to desist from its effort to pass through the fence.

The herein-described poke is susceptible to various modifications without departing from the spirit or principle of the invention, especially in the spur attachments for the upper and lower arms of the collar. While certain specific forms of spur attachments have already been described, the invention may comprehend such modifications of these attachments as illustrated in Figs. 5, 6, and 7 of the drawings.

In Fig. 5 of the drawings is illustrated another form of the upper spur attachment which may be used in place of the upper spur attachment shown in Figs. 2 and 3 of the drawings, which upper spur attachment, as already explained, is made of a single sheet of metal folded so as to embrace the upper arm extension of the collar and formed with the prods or prongs 10. In the modified form of upper spur attachment there is employed a pair of duplicate clip-plates 21, arranged upon opposite sides of the poke and having curved ends 22, embracing the separate wire members of the upper arm extension of the collar. These duplicate clip-plates 21 are securely fastened together and bound on the poke by means of a rivet 22ª, which rivet 22ª has looped therearound and between the plates a spur-wire 23. This spur-wire 23 is doubled upon itself, so as to embrace the rivet, and the separate portions thereof diverge and are curved outwardly and downwardly into the prods or prongs 25, which correspond to the prods or prongs 10 of the other form of upper spur attachment and have precisely the same function.

A modification of the lower spur attachment is shown in Figs. 6 and 7 of the drawings, in which modification the block 11 and the U-clip 13 are dispensed with and in place thereof is employed a pair of duplicate clip-plates 26, respectively embracing opposite sides of the poke and adjustably clamped to the separate parallel portions of the lower arm extension of the collar by means of a bolt 27, which bolt has looped therearound between the plates 26 the spur-wire 28. The spur-wire 28 is formed in substantially the same manner as the spur-wire for the upper spur attachment illustrated in Fig. 5 of the drawings and has the separate portions thereof diverged and extended into the separate prods or prongs 29, corresponding to the prods or prongs 16 and designed to coöperate with the loops 18 of the spring-wire guard 17 in the same manner as the prods or prongs 16.

From the foregoing description it will be seen that the poke constructed in accordance with this invention comprises comparatively few parts and while having provision for prodding the animal at the upper and lower sides of the neck is also constructed in a manner to permit the size of the collar to be readily adjusted to suit the necks of animals of different sizes.

The preferred construction and modifications of my invention have already been described and illustrated; but it will be understood that other changes in the form, proportion, and the minor details of construction may be resorted to without departing from the spirit or sacrificing any of the advantages of the invention.

Having thus described the invention, what is claimed as new is—

1. In an animal-poke, the combination with the collar and arms formed of a single piece of wire, said arms having forwardly-extending hooked ends, of a sheet-metal strip folded over upon the wire at the junction of the collar and upper arm and secured in position, one end of the strip being bent to form a rearwardly and downwardly extending hook provided with a series of pointed teeth or prods, an adjustable clip to secure the two sides of the collar together at their lower ends, and a spring-protected prod projecting rearwardly from the clip, substantially as described.

2. In an animal-poke, the combination with the collar and the arms formed of a single piece of wire, said arms having forwardly-extending hooked ends, of a block having grooves to receive the spaced wires forming the sides of the collar at their junction with the lower arm, a U-shaped clip embracing the wires and the sides of the block, a pin having a flange intermediate its ends, one portion of the pin on one side of the flange extending through said block and clip and having a threaded end, a nut on said threaded end to adjustably clamp the block and clip to the wires and to each other, and the other portion of the pin being bifurcated to form pointed prods, and springs clamped between the clip and block and having looped portions projecting in front of the pointed ends of the prods, substantially as described.

3. In an animal-poke, a collar or a yoke formed of a single length of wire folded upon itself and having upper and lower arm extensions, a sheet-metal clip carrying spurs and embracing the wire at the junction of the collar and the upper arm extension, a rivet-fastening for rigidly securing said metal clip in place, a clip arranged to slide on the lower arm extension and carrying a spur, and means for securing said sliding clip fast in its adjusted position, substantially as set forth.

4. In an animal-poke, a collar or yoke having upper and lower arm extensions, a clip carrying a rigid spur and arranged to slide on the lower arm extension, and fastening means for securing the clip fast in its adjusted position, substantially as set forth.

5. In an animal-poke, a collar or yoke formed of a single length of wire and having upper and lower arm extensions, a clip arranged to slide on the lower arm extension and carrying a rigid spur, and a spring-wire guard having one end arranged within the clip and having an offstanding looped portion normally lying beyond the plane of the spur point or points and adapted to yield to permit said point or points to pass through the looped portion, substantially as set forth.

6. An animal-poke having a two-pronged rigid spur, and a spring-wire guard supported in position by the fastening means of the spur and provided with an offstanding yielding member provided with a pair of spaced loops or eyes, normally lying beyond the plane of the spur-points, substantially as set forth.

7. In an animal-poke, a collar having upper and lower arm extensions, a clip fitted to the lower arm extension and adjustable thereon to provide for varying the size of the collar, a rigid two-pronged spur connected with said clip, a spring-wire guard having an offstanding movable member provided with separate loops normally lying beyond the plane of the spur-points, and a single fastening for securing the clip, the spur, and the spring-wire guard in proper relative positions, substantially as set forth.

In testimony that I claim the foregoing as my own I have hereto affixed my signature in the presence of two witnesses.

LEROY W. FRENCH.

Witnesses:
M. A. SPAULDING,
H. L. HAHNENKRATT.